Jan. 2, 1923.  
C. F. COWDREY.  
BRAKE TESTER FOR VEHICLE WHEELS.  
FILED NOV. 26, 1921.  
1,440,970

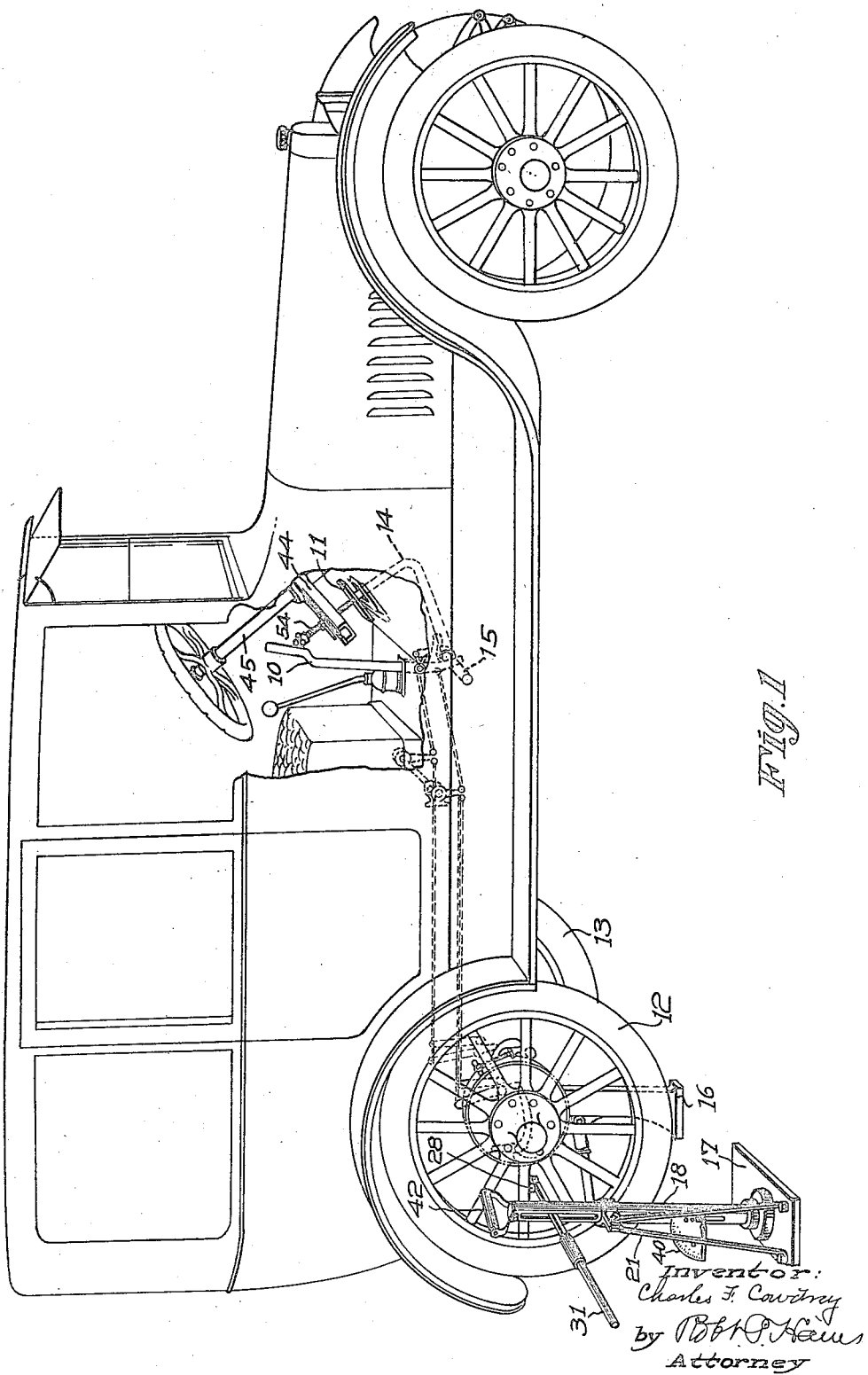

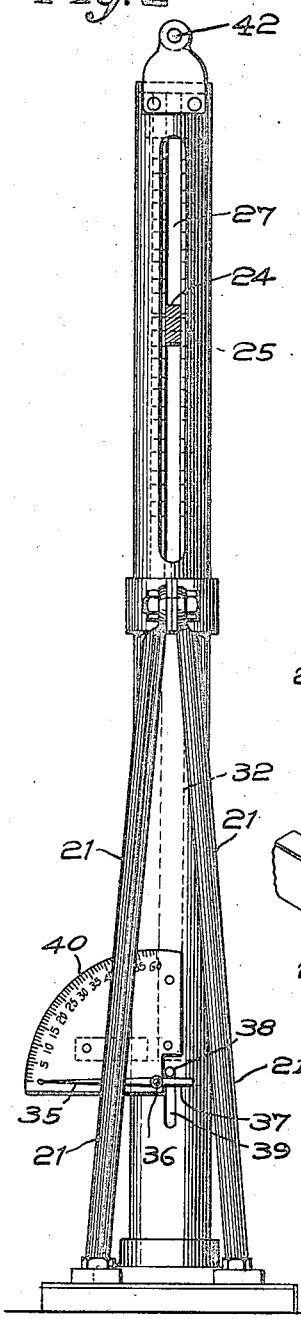
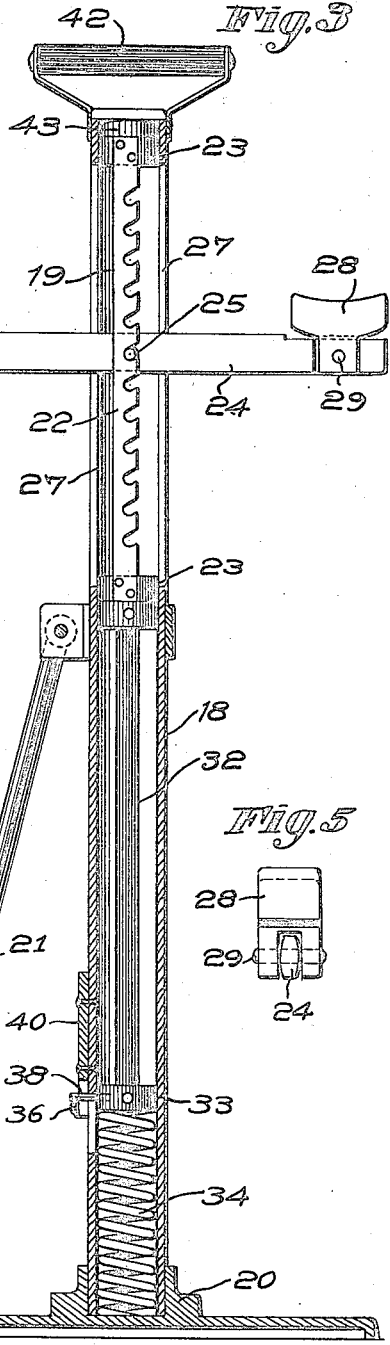
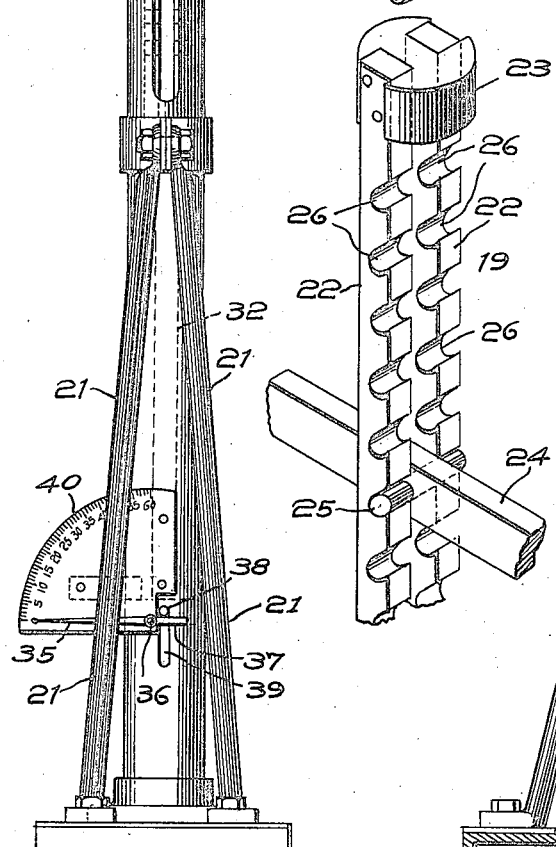
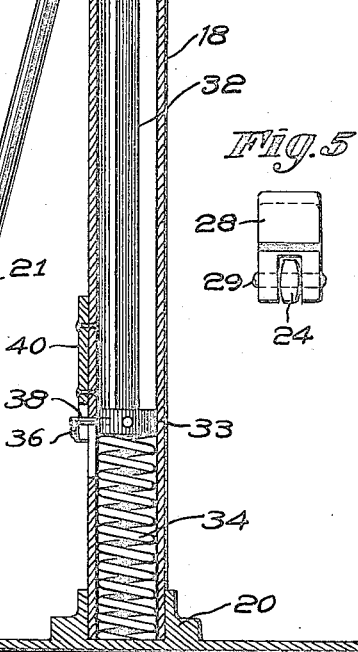
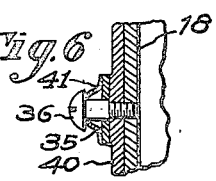

Inventor:  
Charles F. Cowdrey  
by Robt P. Haire  
Attorney

Patented Jan. 2, 1923.

1,440,970

UNITED STATES PATENT OFFICE.

CHARLES F. COWDREY, OF FITCHBURG, MASSACHUSETTS.

BRAKE TESTER FOR VEHICLE WHEELS.

Application filed November 26, 1921. Serial No. 518,023.

*To all whom it may concern:*

Be it known that I, CHARLES F. COWDREY, a citizen of the United States, residing at Fitchburg, county of Worcester, and State of Massachusetts, have invented an Improvement in Brake Testers for Vehicle Wheels, of which the following description, in connection with the accompanying drawings, is a specification, like characters on the drawings representing like parts.

This invention relates to means for testing the action of a brake upon the wheels of a vehicle.

It is important that the brakes of an automobile or other vehicle be so adjusted that they will act with equal or substantially equal force upon the rear wheels of the same, and while this is true of both the foot brake and the emergency brake, the condition of the foot brake is in most cases the more important.

In operating an automobile, the foot brake or running brake is the one that is commonly used to check the speed of an automobile, and the emergency brake usually is applied only while the automobile remains at rest. Even in case of an emergency the foot brake alone is commonly used to check the speed of the automobile, as often there is not time to apply the emergency or hand brake; and furthermore, both hands of the operator may be required at the steering wheel at this critical time.

It is therefore important that the foot brake be maintained in efficient condition operable to check quickly the speed of the automobile, and the braking action upon each wheel should be substantially equal, for if the brake adjustment is such that it acts more forcibly upon one wheel than the other it is likely to cause the rear portion of the automobile to skid sidewise, due to a greater retarding force being exerted upon the automobile by one wheel than the other. The inequality in the brake action at opposite sides of the automobile is one of the large factors that enters into many of the automobile accidents that are now prevalent.

The importance of maintaining the brakes of an automobile equally adjusted is recognized in the automobile industry, and equalization of the brake action upon the wheels at opposite sides of the automobile is sought by hand adjustment of the brakes. Such hand adjustment without means for comparing the action of the brakes, is guesswork, and in most instances the brakes on the wheels at the opposite sides of the automobile do not act with the same retarding effect.

One of the features of the present invention consists in means for holding the foot brake applied to the wheels of a vehicle, and in means for testing the braking action upon the wheels at the opposite sides of the vehicle, while the foot brake is held applied, so that by proper adjustment of the brakes, the braking action thereof on the opposite wheels may be made uniform.

Another feature of the invention consists in novel means for engaging a vehicle wheel and exerting a turning force upon the same sufficient to overcome the holding effect of the brake acting upon the wheel, and in indicating the force required to overcome the holding effect of the brake.

Another feature of the invention consists in an attachment for holding the foot brake treadle in the brake-applying position during the testing of the brake action on the wheels of a vehicle.

The above and other features of the invention and novel combination of parts will be herein described in connection with the accompanying drawings which show one good, practical form of the invention.

In the drawings:—

Figure 1 is a perspective view of an automobile, and shows the brake testing mechanism of the present invention in position to test the action of the brake upon one of the wheels of the automobile;

Fig. 2 is a front elevation of mechanism for testing the brake resistance to the turning movement of a vehicle wheel;

Fig. 3 is a vertical sectional view through the device of Fig. 2;

Fig. 4 is an enlarged perspective view of parts shown in Fig. 3;

Fig. 5 is an end view of the pivoted lever of Fig. 3;

Fig. 6 is an enlarged sectional view of part of the indicating means;

Figure 7:
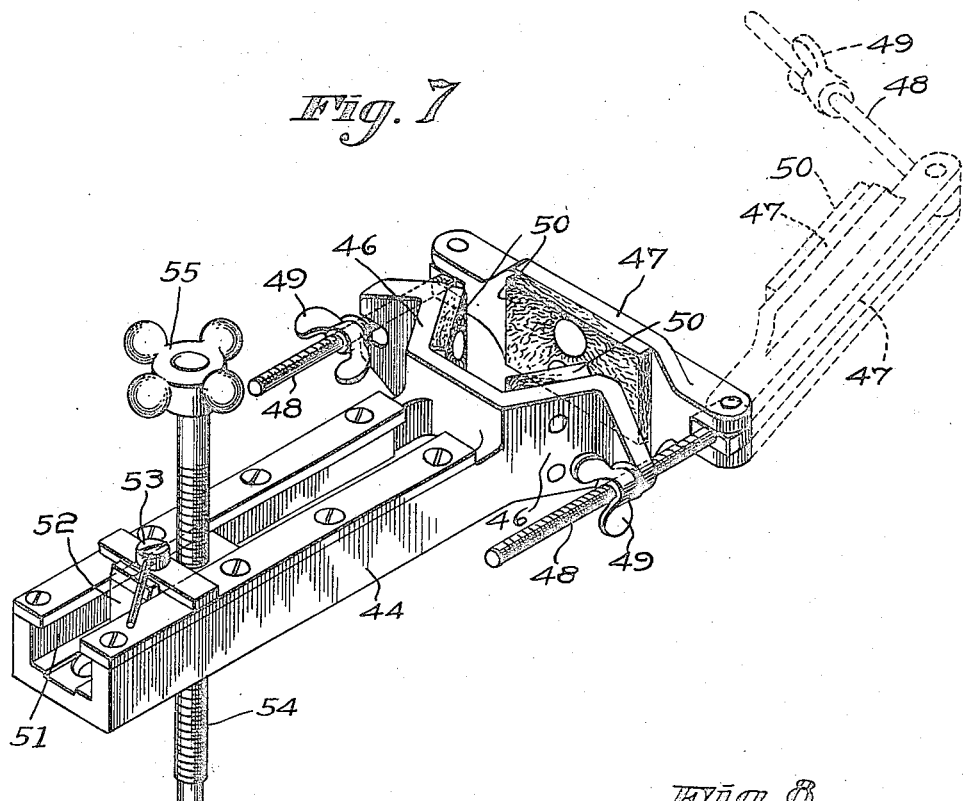
Fig. 7 is a perspective view of an attachment to be described.

Referring to the drawings: The automobile of Fig. 1 forms no part of the present invention, and may be any automobile, the brakes of which it is desired to test. The automobile is shown as having an emergency or hand-operated brake lever 10 and a foot brake treadle 11. The emergency brake lever 10 is commonly operatively connected to brake means operable upon each rear wheel 12 and 13 of the automobile, and the foot brake treadle 11 is commonly operatively connected to other brake means operable upon each rear wheel. The foot brake treadle is commonly provided with a bent arm 14 pivoted at 15, and either the foot brake or the emergency brake may be applied independently of the other.

In testing the action of a brake upon the automobile wheels, the wheel being tested should be relieved from the weight of the automobile, and this may be accomplished by placing a jack 16 under the rear axle and jacking a wheel up in the usual manner. The brake to be tested should be applied, and if the emergency brake is being tested this is done by moving the lever 10 rearwardly to the brake-applying position where it will be held automatically by the usual ratchet and pawl means, but if the foot brake is to be tested, difficulty is experienced in that automobiles are not provided with mechanism for retaining the foot brake treadle in the brake-applying position.

The action of the brake upon a wheel of an automobile or other vehicle may be readily tested by the novel mechanism shown in Figs. 1 to 6 inclusive. This mechanism, in the embodiment of the invention illustrated, consists of a base 17 having a column 18 extending upwardly therefrom to guide a yieldingly supported post 19. The column 18 in the present instance is in the form of a tube, the lower end of which is seated in a socket 20 upon the base 17, and inclined braces 21 are provided extending upwardly from the base to an intermediate portion of the column to increase the rigidity of the structure. The post 19 may consist of spaced bars 22 provided at their ends with blocks 23 secured between them, and the blocks 23 preferably are rounded to form piston-like heads that slidably fit the interior of the tubular column 18. The bars 22 are spaced apart sufficiently to receive the lever 24 therebetween and this lever is provided with a pin or trunnion 25 adapted to fit in any one of the notches 26 of the bars 22. The arrangement is such that the lever may be pivotally supported at any one of a plurality of different elevations from the ground, and since the lever extends loosely between the spaced bars 22 and through the opposite slots 27 in the column 19 it may be readily raised or lowered to engage the pin 25, with the desired notches 26. At one end of the lever 24 is provided means engageable with the wheel to be turned, and in the present instance comprising a saddle 28 pivotally secured to the lever by a pin 29 and adapted to engage a spoke of a wheel as shown in Fig. 1. The other end of the lever 24 is provided with a socket 30 adapted to receive an end of an extension rod 31.

It is desirable to provide means for indicating the force required to overcome the holding effect of the brake and to this end, in the present instance, the post 19 has a lower portion 32 the lower end of which has a piston-like head 33 that rests upon the upper end of a coiled spring mounted in the lower portion of the column 18. The arrangement is such that the post 19 moves downwardly proportionately to the increase in the pressure exerted upon it by the lever 24, and this downward movement may be indicated by any appropriate means. The means illustrated for this purpose consists of a pointer 35 pivotally mounted at 36 and the pointer has a rearwardly-extending portion 37 that extends across the path of movement of the pin 38 extending outwardly from the head 33 through a slot 39 in the column. A graduated plate 40 may be secured to the column in position to indicate the angle through which the pointer 35 swings.

It is desirable that the pointer should remain in the position to which it is swung by the force required to overcome the holding effect of the brake being tested, and this may be accomplished by providing means for exerting sufficient friction upon the pointer to hold it in the position to which it is moved. In the present instance a friction washer 41 mounted on the pin 36 (see Fig. 6) serves to hold the pointer in the position of maximum movement.

The upper end of the column 18 preferably is provided with a handle 42 to facilitate handling of the testing device, and the upper end of the column may be closed by a cap 43 that may serve to limit the upward movement of the post 19 by the spring 34.

In testing the braking effect of the foot brake, this brake should not only be applied during the testing of its effect upon the wheels, but it should be maintained in the same position of adjustment during the testing of its effect upon each rear wheel; and to this end an important feature of the present invention consists in means for maintaining the foot brake in the brake-applying position during the brake testing operation.

Figure 8:
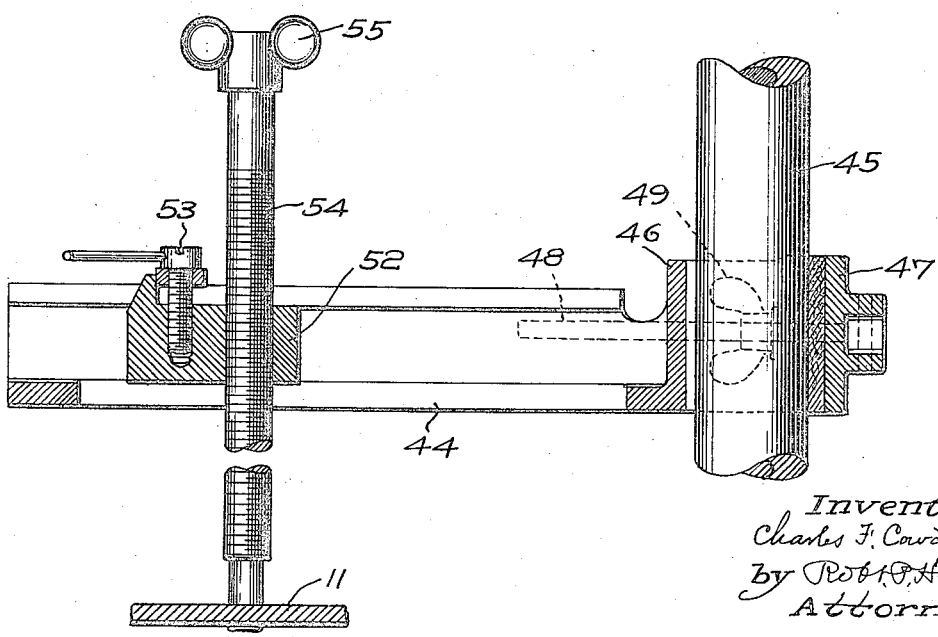
Fig. 8 is a longitudinal sectional view through the attachment shown in Fig. 7.

One good form of means to this end is shown in Figs. 1, 7 and 8, and consists of an attachment comprising a bracket 44 constructed to be removably secured to the steering post 45 of the automobile by means of the fixed jaws 46 upon the bracket and the adjustable jaw 47 connected to the bracket by the bolts 48 and wing nuts 49. The jaws preferably have their active faces covered with leather or other yielding material 50.

The bracket 44 preferably has a slide-way 51 in which the slide 52 is adjustably mounted, and the slide may be secured in its adjusted position by the lock means 53. Through the slide 52 extends a threaded pin 54 having a head 55 at its upper end to facilitate turning of the pin by hand.

The attachment just described may be secured to the steering post 45 in the position shown in Fig. 1, the slide 52 may be adjusted to bring the pin 54 in alignment with the foot treadle 11, and this treadle may be held in the desired brake applying position by adjusting the threaded pin 54. The braking effect of the foot brake upon each rear wheel may now be tested accurately by placing the testing device in the position shown in Fig. 1, then engaging the pin 25 of the lever 24 with that notch which will support the lever in substantially a horizontal position when the saddle 28 engages a spoke that is approximately horizontal. A force may then be exerted upon the extension rod 31 of the lever sufficient to turn the wheel 12 against the friction action of the brake, and the force required will be indicated by the position to which the pointer 35 is moved upon the dial plate 40.

From the foregoing description and the drawings it will be apparent that in accordance with the present invention the foot brake of a vehicle may be quickly and accurately tested, and that the foot brake treadle may be maintained in the desired brake-applying position throughout the testing of the brake action upon each wheel.

What is claimed is:

1. The combination of an automobile with brakes for retarding rotative movement of the wheels thereof, a treadle, connections between the treadle and brakes for applying the brakes by depression of the treadle, a brake treadle depressor for holding the brake treadle depressed to the same extent during the operation of testing the brake effect upon the wheels of the automobile, and force measuring means for exerting a force upon a wheel sufficient to turn the wheel under the resistance of the brake.

2. The combination of an automobile with brakes for retarding rotative movement of the wheels thereof, a brake applying treadle for applying the brakes to the wheels, a brake treadle depressor for holding the brake treadle depressed to the same extent during the operation of testing the resulting brake effect on each wheel of the automobile, means engageable with a wheel to turn it under brake resistance and while the wheel is relieved from the weight of the automobile, and indicating means operatively connected to said wheel turning means for determining the force exerted to turn a wheel under brake resistance.

3. The combination of an automobile with brakes for retarding rotative movement of the wheels thereof, a brake treadle for applying the brakes to the wheels, a brake treadle depressor adjustable to different brake-applying positions to hold the brake treadle depressed to the desired extent during the operation of testing the resulting brake effect on each wheel of the automobile, and force measuring means for exerting a force upon a wheel sufficient to turn the wheel under the resistance of the brake while the wheel is relieved of the weight of the automobile.

4. The combination of an automobile with brakes for retarding rotative movement of the wheels thereof, a treadle, connections between the treadle and brakes for applying the brakes by depression of the treadle, a brake treadle depressor connected to the steering mechanism of the automobile for holding the brake treadle depressed to the same extent during the operation of testing the brake effect upon each wheel of the automobile, and force measuring means for exerting a force upon a wheel sufficient to turn the wheel under the resistance of the brake while the wheel is relieved of the weight of the automobile.

5. The combination of an automobile with brakes for retarding rotative movement of the wheels thereof, a foot treadle, connections between the foot treadle and brakes for applying the brakes by depression of the treadle, an attachment constructed and arranged to be secured to the steering post of the automobile and adjustable to a position above the foot treadle to hold the foot treadle depressed to the same extent during the operation of testing the brake effect upon each of the rear wheels of the automobile, and force measuring means for exerting a force upon a wheel sufficient to turn the wheel under the resistance of the brake while the wheel is free from the weight of the automobile.

6. A brake tester for testing the brake resistance to the turning movement of vehicle wheels, comprising, in combination, a support, a lever operatively supported thereby and having engagement with the support at any one of a plurality of different elevations from the ground, means upon the lever engageable with a wheel to exert a force tending to turn the wheel, and means for indicating the force required to effect turning movement of the wheel.

7. A brake tester for testing the brake resistance to the turning movement of vehicle wheels, comprising, in combination, a support, a lever adapted to be trunnioned upon the support at any one of a plurality of different elevations from the ground, means upon the lever engageable with the wheel to exert a force tending to turn the wheel, and means for indicating the force required to effect turning movement of the wheel.

8. A brake tester for testing the brake resistance to the turning movement of vehicle wheels, comprising, in combination, a yieldingly mounted post, a lever operatively supported by the post, means upon the lever engageable with a wheel to exert a force tending to turn the wheel, and means actuated by the yielding movement of said post under the pressure of the lever for indicating the force required to effect turning movement of the wheel.

9. A brake tester for testing the brake resistance to the turning movement of vehicle wheels, comprising, in combination, a post supported for yielding downward movement, wheel engaging means supported by the post and operable to exert a force tending to turn the wheel, and means actuated by the yielding movement of the post under the downward pressure of the wheel engaging means for indicating the force required to effect turning movement of the wheel.

10. A brake tester for testing the brake resistance to the turning movement of vehicle wheels, comprising, in combination, a post supported for yielding downward movement, wheel engaging means adjustable lengthwise of said post and operable to exert a force upon the wheel sufficient to turn it while a brake is applied, and means actuated by the yielding downward movement of said post under the action of the wheel turning force to indicate the force applied.

11. A brake tester for testing the brake resistance to the turning movement of vehicle wheels, comprising, in combination, a post supported for yielding downward movement, a lever fulcrumed upon said post to turn a wheel against the holding action of a brake, and means operable by the downward movement of said post under the action of said lever to record the turning force applied to the wheel.

12. A brake tester for testing the brake resistance to the turning movement of vehicle wheels, comprising, in combination, a support, an arm extending laterally from said support and having wheel engaging means, means for supporting the arm at any one of a plurality of different elevations from the ground, means for exerting a lifting force upon said arm sufficient to turn a wheel under brake resistance, and means for indicating the turning force applied to the wheel.

13. A brake tester for testing the brake resistance to the turning movement of vehicle wheels, comprising, in combination, a support, a post mounted upon the support for yielding downward movement, an arm extending laterally from the post and provided with wheel engaging means, means for imparting a lifting movement to said arm to turn the wheel, and means actuated by the yielding downward movement of the post to indicate the force required to effect turning movement of the wheel.

In testimony whereof, I have signed my name to this specification.

CHARLES F. COWDREY.